United States Patent
Gadiraju et al.

(10) Patent No.: US 12,506,344 B2
(45) Date of Patent: Dec. 23, 2025

(54) METHOD FOR OPERATING A WIND FARM AND A WIND FARM

(71) Applicant: General Electric Renovables Espana, S.L., Barcelona (ES)

(72) Inventors: Kasi Viswanadha Raju Gadiraju, Bangalore (IN); Santhosh Kumar C, Bangalore (IN); Shanmuga-Priyan Subramanian, Hamburg (DE); Sumitha Mohan, Bangalore (IN); Benjamin Palethorpe, Nantes (FR)

(73) Assignee: GE Vernova Renovables Espana, S.L., Barcelona (ES)

( * ) Notice: Subject to any disclaimer, the term of this patent is extended or adjusted under 35 U.S.C. 154(b) by 419 days.

(21) Appl. No.: 18/074,793

(22) Filed: Dec. 5, 2022

(65) Prior Publication Data

US 2023/0178994 A1 Jun. 8, 2023

(30) Foreign Application Priority Data

Dec. 6, 2021 (EP) ..................................... 21212570

(51) Int. Cl.
*H02J 3/38* (2006.01)
*F03D 7/04* (2006.01)

(52) U.S. Cl.
CPC .............. *H02J 3/388* (2020.01); *F03D 7/048* (2013.01); *H02J 2300/28* (2020.01)

(58) Field of Classification Search
CPC ........ F03D 7/048; F03D 7/0284; F03D 7/026; F03D 7/04; F03D 9/00; F03D 9/255; G05B 2219/2619
See application file for complete search history.

(56) References Cited

U.S. PATENT DOCUMENTS

| 10,767,630 | B1* | 9/2020 | Venkitanarayanan ....................... F03D 7/0284 |
| 2010/0308585 | A1* | 12/2010 | Jorgensen ............... F03D 7/048 290/44 |
| 2014/0035284 | A1* | 2/2014 | Bech ....................... F03D 9/255 290/44 |
| 2014/0239639 | A1* | 8/2014 | Bai .......................... F03D 7/048 290/44 |
| 2015/0142191 | A1* | 5/2015 | Bengtson ................ F03D 7/042 700/287 |

(Continued)

*Primary Examiner* — Darrin D Dunn
(74) *Attorney, Agent, or Firm* — Dority & Manning, P.A.

(57) ABSTRACT

A method for operating a wind farm having a string (S1-S3) of wind turbines (100-100d) which are electrically connectable with each other and a grid (510, 550) via power connections (Cab-Cd) is disclosed. Each wind turbine includes a rotor (106) with rotor blades (108), and a power conversion system (118, 210, 238) mechanically connected with the rotor (106). The method includes disconnecting the string (S1-S3) from the grid (510, 550), and identifying a primary wind turbine (100a, 100c) of the disconnected string (S1-S3) which is electrically connectable with at least one secondary wind turbine (100b-10d) of the disconnected string (S1-S3). The power conversion system (118, 210, 238) of the primary wind turbine (100a, 100c) includes a reactive power capability (RPC) that at least matches a reactive power (RP) of a cluster (C1, C11, C12) to be formed by electrically connecting the primary wind turbine (100a, 100c) with the at least one secondary wind turbine (100b-100d) of the disconnected string (S1-S3).

12 Claims, 6 Drawing Sheets

(56) References Cited

U.S. PATENT DOCUMENTS

| | | | |
|---|---|---|---|
| 2015/0295529 A1* | 10/2015 | Rose, Jr. | F03D 9/257 |
| | | | 290/44 |
| 2017/0234299 A1* | 8/2017 | Kjær | F03D 9/257 |
| | | | 290/44 |
| 2019/0226454 A1* | 7/2019 | Bjørn | F03D 7/028 |
| 2020/0127460 A1* | 4/2020 | Djan-Sampson | H02J 3/38 |
| 2020/0400120 A1* | 12/2020 | Brogan | H02J 11/00 |
| 2021/0164443 A1* | 6/2021 | Brombach | F03D 7/048 |
| 2021/0344198 A1* | 11/2021 | Tiwari | H02J 3/18 |
| 2024/0151208 A1* | 5/2024 | Brogan | F03D 7/026 |

\* cited by examiner

METHOD FOR OPERATING A WIND FARM AND A WIND FARM

FIELD

The present subject matter relates generally to operating a wind farm having wind turbines, in particular during a loss or absence of a grid the windfarm is connectable to, and to a respective wind farm.

BACKGROUND

Wind power is considered one of the cleanest, most environmentally friendly energy sources presently available, and wind turbines have gained increased attention in this regard. A modern wind turbine typically includes a tower, generator, gearbox, nacelle, and a rotor with one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Due to faults in the utility grid or other reasons, the wind farm may be disconnected from the utility grid. In this state, wind turbines may be required to supply power to its auxiliary loads to keep controllers, communication, yaw operation and other critical systems alive. This may be for safety reasons and/or to facilitate reconnecting the wind farm to the utility grid after grid recovery. Electric energy storage such as UPS which may be provided within the wind turbines, may only feed power to these critical systems for e.g. a few minutes during loss of grid. Further, start-up requirements of the wind turbines prior to connecting to the grid again and higher duty cycles typically demand larger energy storage systems and/or active and reactive power capabilities, in particular for large wind farms and/or wind farms with larger distances between the wind turbines. For longer periods, auxiliary power may be provided by diesel generators. However, in particular for offshore wind farms, diesel generators or the like may be too large and/or expensive to install, run, refill and/or maintain.

Accordingly, the present disclosure provides a method for operating a wind farm, a wind farm, and a computer program product or a computer-readable storage medium for controlling the wind farm.

BRIEF DESCRIPTION

Aspects and advantages of the invention will be set forth in part in the following description, or may be obvious from the description, or may be learned through practice of the invention.

In one aspect, the present disclosure is directed to a method for operating a wind farm. The wind farm includes a string of wind turbines which are electrically connectable with each other and a grid via (electric) power connections. Each wind turbine includes a rotor including a rotor blade, and a power conversion system mechanically connected with the rotor. The method includes disconnecting the string from the grid, and identifying, in the disconnected string, a primary wind turbine which is electrically connectable with at least one secondary wind turbine of the disconnected string. The power conversion system of the primary wind turbine includes a reactive power capability that at least matches a reactive power of a cluster which can be formed by electrically connecting the primary wind turbine with the at least one secondary wind turbine of the disconnected string.

Due to identifying the primary wind turbine having, when operated in island operating mode (disconnected from the grid), a power conversion system with a reactive power capability which is sufficient to meet the reactive power of a cluster of wind turbines to be formed, i.e. is sufficient to compensate the reactive power that is generated in the (later) formed cluster of connected (operating) wind turbines, the wind turbines of the disconnected string may be operated in one or more clusters instead of operating each (available) wind turbine of the string in the island operating mode.

This can result in a number of advantages. First, the storage capacity and/or size of battery energy storage system(s) (BESS) of the individual wind turbines may be reduced or even optimized. This applies in particular to respective battery energy storage systems for yawing and/or pitching, e.g. yaw back-up systems. Thus, materials as well as costs for equipment and maintenance may be saved. Note that respective charge/discharge cycles may be reduced for BESS. In result, even the ecological footprint of the wind turbines may be reduced. Second, black-start operation for restoration of power system may be facilitated. The latter is because the (electric power) collector system of the string, in particular the power connections between the wind turbines, is already at least partly energized when the wind turbines are operated in cluster(s) of connected wind turbines. Note that the power connections between the wind turbines may produce comparatively large reactive power in wind farms with distributed wind turbines, in particular offshore wind farms. Third, at least large diesel generators and/or tanks may be avoided, and/or their usage may be reduced during grid outage periods.

As used herein, the term "string of wind turbines" intends to describe that the wind turbines and their power conversion systems, respectively, are electrically connectable with each other to form a series circuit, in particular via respective power connections. For example, power cables and power switches arranged between adjacent wind turbines and their power conversion systems, respectively, may be used to electrically connect the wind turbines to each other (in pairs) and disconnect the wind turbines. All wind turbines of a string may be of the same type and/or have the same power rating. However, it is also possible that a string includes wind turbines of different type and/or power rating.

As used herein, the term "cluster of wind turbines" intends to describe two or more wind turbines which are connected with each other via respective (electric) power connections and typically form a series circuit. Accordingly, the wording that the reactive power capability of the primary wind turbine (at least substantially) matches/balances a reactive power of a cluster intends to describe that the reactive power capability matches/balances the reactive power of the secondary wind turbines and the power connection(s) of the cluster. Note that, depending on the reactive power capability of the primary wind turbine and the reactive power of the other wind turbines and the power connections, several, typically as many as possible of the other wind turbines may be assigned to the cluster. Even all wind turbines of a string may be assigned to a single cluster. The number of wind turbines in a cluster may be in a range from 2 to 25, more typically in a range of 5 to 10.

As used herein, the term "island operating mode" refers to an operating mode in which the wind turbine(s) is (are) not connected with a utility grid.

As used herein, the terms "black start" refers to processes for restoring part or all of an electrical grid following a partial or complete shutdown. In particular, power from a primary wind turbine may be provided to one or more secondary wind turbines to bring one or more secondary wind turbines back online and back to power generation.

In one embodiment, the method includes (after disconnecting the string from the grid, for example upon detecting a loss of the grid) searching for, typically identifying, in a string of wind turbines of a wind farm which is disconnected from a grid, a primary wind turbine and at least one secondary wind turbine which are electrically connectable with each other via respective power connections for forming a cluster of wind turbines so that the power conversion system of the primary wind turbine has a reactive power capability that at least (substantially) matches a reactive power of the cluster (to be formed and when operating).

In particular, identifying the primary wind turbine may include searching for a wind turbine to be identified as the primary wind turbine which has a reactive power capability that at least matches the reactive power of the at least one secondary wind turbine and any power connection between the primary wind turbine and the at least one secondary wind turbine.

Further, the identified primary wind turbine and as many as possible, e.g. any of the remaining (available) wind turbines of the disconnected string may be assigned to a cluster, provided the reactive power capability of the identified primary wind turbine (still) at least matches the reactive power of the remaining (secondary) wind turbines and/including the respective power connections between the wind turbines of the cluster to be formed.

If the power conversion system of one wind turbine of the disconnected string can meet (compensate) the reactive power of the available wind turbines and power connections of the string, only one cluster is typically formed.

Otherwise, two or more primary wind turbines (and corresponding secondary wind turbines to be connected with one of the primary wind turbines) may be searched for/identified for respective clusters of the disconnected string.

Note that wind turbines that are not available are not be assigned to the cluster(s) (remain outside the cluster(s)). However, such wind turbines may later be added to the cluster(s) upon becoming available again.

Typically, the wind turbine with the largest reactive power capability is identified as the respective primary wind turbine for the respective cluster.

The clustering of wind turbines and identifying primary and secondary wind turbine(s), respectively, may be based on actual reactive power capabilities and/or the (electric) specifications of the wind turbines and the power connections of the respective string.

This may even be done at least in part in advance. For example, based on the specifications of the wind turbines and the power connections, one or more power connections which are to be isolated from the cluster, respective primary wind turbines and/or corresponding secondary wind turbine(s) may be predetermined (in advance) and e.g. stored in a look-up table. Later and after disconnecting the string(s) from the grid, available of the predetermined primary wind turbine(s) may be identified as primary wind turbines for the clusters to be formed (if applicable without predetermined power connection(s) to be isolated).

After forming the cluster(s), the respective identified primary wind turbine is typically operated in a grid forming operating mode to establish a respective stable local grid for the respective cluster of wind turbines. In the following the (stable) grid of the respective cluster is also referred to as (stable) grid of the string and (stable) local sub grid of the wind farm.

Note that the wind farm may include a power grid bus to which the string(s) may be (re-) connected.

Note further that, if the wind turbines of a string are clustered into several (at least two) disconnected clusters, a corresponding number of stable local grids is typically formed for one string.

During grid forming operating mode, the primary wind turbine typically energizes the power connections (cluster cables), auxiliary subsystems (loads) of the secondary wind turbine(s) in the cluster, which are typically operated in an idling operating mode or a stand still operating mode, and maintains voltage and frequency of the respective (stable) local grid.

During operating the primary wind turbine in the grid forming operating mode, its power conversion system converts input motive power received from the rotor into electrical output power, at least substantially compensates reactive power produced in the local grid of the formed cluster, and provides at least a major portion of the active power of the formed cluster demand to the local grid of the cluster.

The grid forming operating mode may be understood as a particular island operating mode.

After reconnecting to the utility grid again, the primary and secondary wind turbine are operated again in normal operating mode, in which the respective power conversion system converts input motive power received from the rotor into electrical output power and provides at least a major portion of the electrical output power to the utility grid.

The term "auxiliary subsystem" as used herein intends to describe systems of the (secondary) wind turbine(s) which may be desired and/or consume electrical power at least from time to time when the wind turbine is operated in an idling operating mode and/or a stand still operating mode. Accordingly, the term "auxiliary subsystem" includes operational subsystems used during idling operating mode and/or stand still operating mode.

In particular, each of the wind turbines may include one or more, typically several or even all of the following auxiliary subsystems: a pitch system, a yaw system, a heating system, a cooling system, a hydraulic system, and a rechargeable energy storage devices such as a UPS.

The wind turbines may include several respective heating system and/or cooling systems, for example for a generator, a converter and/or a transformer of the respective power conversion system.

Further, a rotor blade heating and/or rotor blade deicing subsystem may be provided as respective auxiliary subsystem for wind turbines in wind farms operating in cold regions.

Furthermore, wind turbines may include several rechargeable energy storage devices for different components.

Even further, the turbine controller, measurement devices and any communication device may also be considered as auxiliary subsystems.

Operating the secondary wind turbine(s) of the cluster(s) in idling operating mode may be preferred compared to operating in the stand still operating mode. This is because reconnecting the wind turbine(s) of the string to a recovered grid and operating the wind turbine in a normal operating mode again may be facilitated when the wind turbines are already operating in the idling operating mode.

The processes of searching for and of identifying primary (and secondary) wind turbine(s), respectively, if the search is successful, typically includes determining a (total) reactive power of the disconnected string assuming that the (available) wind turbines are connected with each other (but disconnected from the utility grid and any further string of wind turbines).

Thereafter, respective (current) reactive power capabilities of the power conversion systems of the wind turbines conversion systems may be determined.

If the reactive power of the disconnected string is larger than any of the determined reactive power capabilities, power connection(s) between the wind turbines and/or to the power grid bus, which (are expected to) generate comparatively large/to large reactive power when connected, may be determined (selected) to be isolated from the cluster(s) to be formed.

Accordingly, the reactive power of the cluster(s) without the power connection(s) to be isolated may be balanced by the primary wind turbine(s) after forming the cluster(s).

For example, two (or more) primary wind turbines may be identified in a string, each of the at least two primary wind turbines having a respective reactive power capability that at least matches a reactive power of a respective cluster of two (or more) electrically isolated clusters to be formed by electrically connecting the two (or more) primary wind turbines with at least one respective secondary wind turbine.

Upon detecting a recovery of the grid, the disconnected string may be reconnected with the grid.

In one aspect, the present disclosure is directed to a method for operating a wind farm. The wind farm includes a string of wind turbines which are electrically connectable with each other and a (utility) grid via (electric) power connections. Each wind turbine includes a rotor including a rotor blade, and a power conversion system mechanically connected with the rotor. The method includes determining an actual reactive power capability of the power conversion systems of the wind turbines of the string if the string is disconnected from the grid, determining at least one of the power connections that produces, when connected with the power conversion system having a largest actual reactive power capability, a reactive power which is too large to be met, and dividing the wind turbines of the string into one or more clusters which are (electrically) isolated from the at least one of the power connections.

In one embodiment the wind farm has several strings of wind turbines, wherein the strings are separately connectable with a point of common coupling of the wind farm connectable to an external grid, in particular a utility grid. In this embodiment, the methods explained above are typically performed independently for each of the several strings (until the strings are to be reconnected to the external/utility grid, respectively).

In one aspect, the present disclosure is directed to a wind farm. The wind farm includes a string of wind turbines which are electrically connectable with each other and a grid. Each wind turbine includes a rotor including a rotor blade, and a power conversion system mechanically connected with the rotor. The wind farm further includes a control system communicatively coupled with the power conversion systems of the wind turbines and configured to disconnect the string from the grid, and to identify a primary wind turbine that is electrically connectable with at least one secondary wind turbine of the disconnected string, and includes a power conversion system having a reactive power capability that at least matches a reactive power of a cluster which can be formed by electrically connecting the primary wind turbine with the at least one secondary wind turbine of the disconnected string.

According to an embodiment, the control system includes a wind farm controller and a respective wind turbine controller for each power conversion system.

The wind farm controller is communicatively coupled with the wind turbine controller, and may be operable as a primary controller, whereas the wind turbine controllers may be operable are as secondary controllers.

Typically, it is the wind farm controller that is configured to search for/identify the (at least one) primary wind turbine having a reactive power capability at least matching the reactive power of the cluster to be formed by electrically connecting the primary wind turbine with the at least one secondary wind turbine of the disconnected string, for example at least matching the reactive power of a few or even any remaining (available) wind turbines and the respective power connections of the disconnected string if the reactive power capability is large enough.

The turbine controllers may be configured to control the respective wind turbine in different modes, in particular island operating mode, grid forming mode, idling mode and/or stand still mode.

The control system, in particular the wind farm controller is typically configured to identify at least two primary wind turbines each of which is electrically connectable with at least one secondary wind turbine of the disconnected string, wherein the power conversion system of each of the at least two primary wind turbines has reactive power capability that at least matches a reactive power of a respective cluster to be formed by electrically connecting the respective primary wind turbine with the at least one secondary wind turbine of the disconnected string.

Further, the control system, in particular the wind farm controller is typically configured to electrically connect the identified primary wind turbines with the respective at least one secondary wind turbine of the disconnected string to form respective clusters of wind turbines.

Further, the control system, in particular the wind farm controller is typically configured to operate the identified primary wind turbines in island operating, in particular a respective grid forming mode so that the active and reactive power of the clusters is met by the power conversion system of the respective primary wind turbine.

The wind farm may include several strings of wind turbines. In this embodiment, the control system is typically configured to control the several strings of wind turbines independently of each other when not connected with the grid (and each other).

Further, the wind farm may be an offshore wind farm but also an onshore wind farm.

Typically, the wind farm is configured to perform the method as explained herein.

In yet another aspect, the present disclosure is directed to a computer program product or a non-transitory computer-readable storage medium comprising instructions which, when executed by one or more processors of a system, in particular a control system of the wind farm as explained herein, cause the system to carry out the method as explained herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Figure 1:
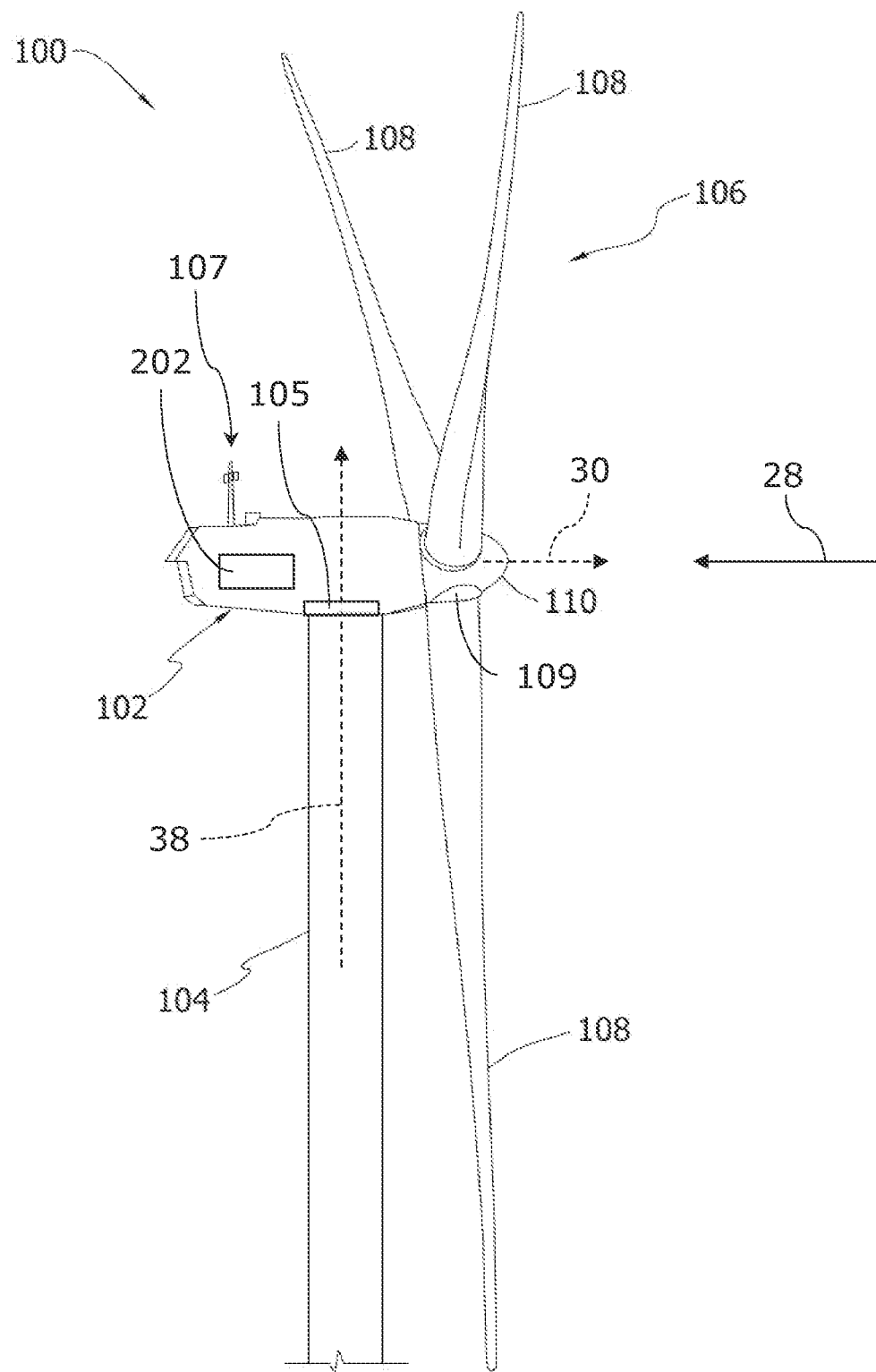
FIG. 1 illustrates a perspective view of one embodiment of a wind turbine that may be part of a wind farm according to the present disclosure.

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a portion of an exemplary wind turbine 100. In the exemplary embodiment, the wind turbine 100 is a horizontal-axis wind turbine. Alternatively, the wind turbine 100 may be a vertical-axis wind turbine. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

The rotor blades 108 are spaced about the hub 110 to facilitate rotating the rotor 106 to enable kinetic energy to be transferred from the wind into usable mechanical energy, and subsequently, electrical energy.

In one embodiment, the rotor blades 108 have a length ranging from about 15 meters (m) to about 91 m. Alternatively, rotor blades 108 may have any suitable length that enables the wind turbine 100 to function as described herein. For example, other non-limiting examples of blade lengths include 20 m or less, 37 m, 48.7 m, 50.2 m, 52.2 m or a length that is greater than 91 m. As wind strikes the rotor blades 100 from a wind direction 28, the rotor 106 is rotated about an axis of rotation 30. As the rotor blades 108 are rotated and subjected to centrifugal forces, the rotor blades 108 are also subjected to various forces and moments. As such, the rotor blades 108 may deflect and/or rotate from a neutral, or non-deflected, position to a deflected position.

Moreover, a pitch angle of the rotor blades 108, i.e., an angle that determines a perspective of the rotor blades 108 with respect to the wind direction, may be changed by a pitch system 109 to control the load and power generated by the wind turbine 100 by adjusting an angular position of at least one rotor blade 108 relative to wind vectors. During operation of the wind turbine 100, the pitch system 109 may change a pitch angle of the rotor blades 108 such that the rotor blades 108 are moved to a feathered position, such that the perspective of at least one rotor blade 108 relative to wind vectors provides a minimal surface area of the rotor blade 108 to be oriented towards the wind vectors, which facilitates reducing a rotational speed and/or facilitates a stall of the rotor 106.

A blade pitch of each rotor blade 108 may be controlled individually by a wind turbine controller 202 or by a pitch control system. Alternatively, the blade pitch for all rotor blades 108 may be controlled simultaneously by said control systems.

Further, in the exemplary embodiment, as the wind direction 28 changes, a yaw direction of the nacelle 102 may be rotated, by a yaw system 105, about a yaw axis 38 to position the rotor 106 with respect to wind direction 28.

The yaw system 105 may include a yaw drive mechanism provided by nacelle 102.

Further, yaw system 105 may also be controlled by wind turbine controller 202.

Figure 2:
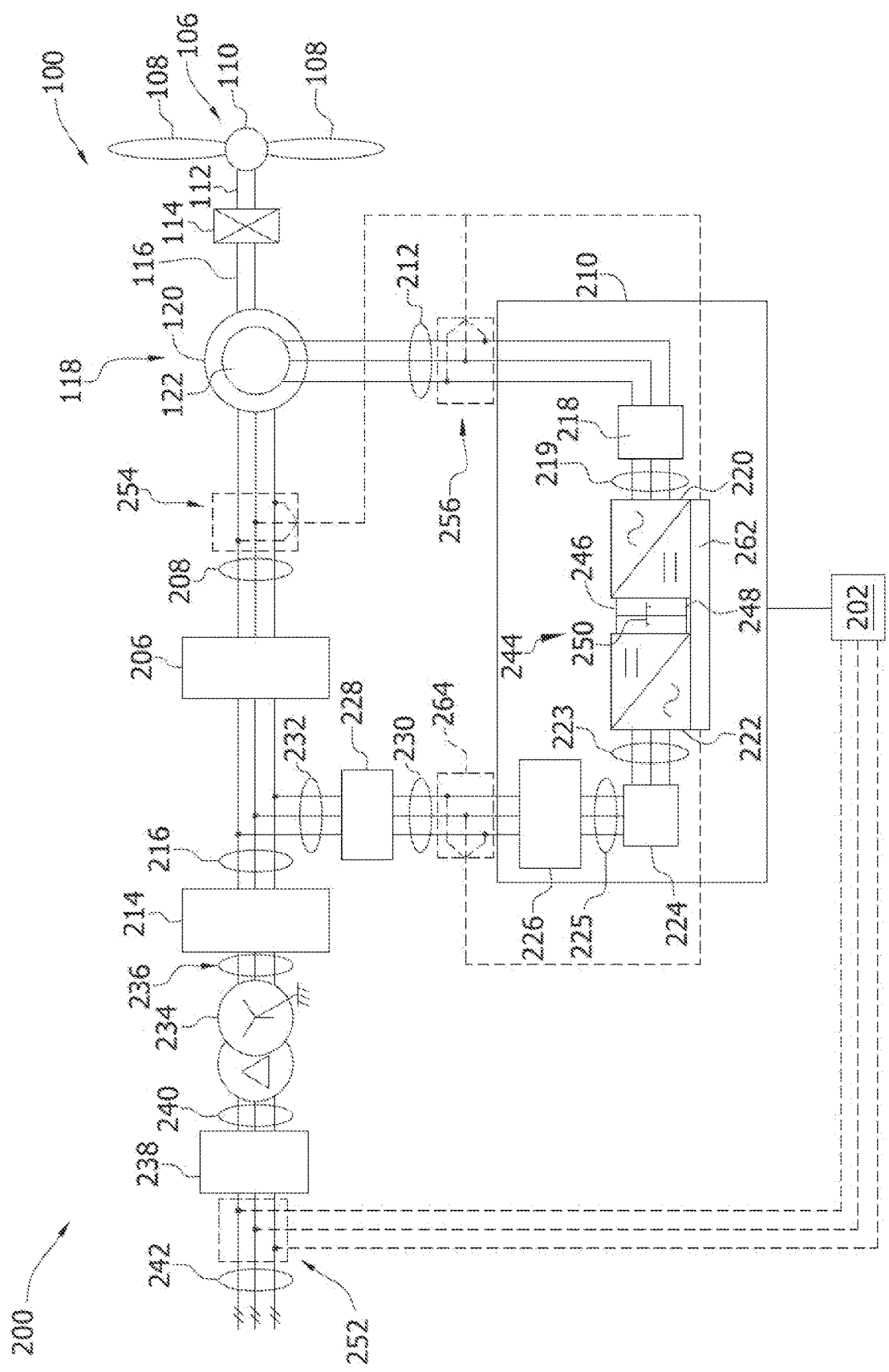
FIG. 2 illustrates a schematic view of one embodiment of an electrical power system and a control system suitable for use with the wind turbine shown in FIG. 1.

For positioning nacelle 102 appropriately with respect to the wind direction 28 as well as detecting a wind speed, the nacelle 102 may also include at least one meteorological mast 107 that may include a wind vane and anemometer (neither shown in FIG. 2). The mast 107 may provide information to the wind turbine controller 202 regarding ambient conditions. This may include wind direction and/or wind speed as well as ambient temperature, ambient moisture, precipitation type and/or amount (if any).

In the exemplary embodiment, the wind turbine controller 202 is shown as being centralized within the nacelle 102, however, the wind turbine controller may also be a distributed system throughout the wind turbine 100, on a support system (not shown in FIG. 1), within a wind farm, and/or at a remote control center. The wind turbine controller 202 includes a processor configured to perform the methods and/or steps described herein.

Referring now to FIG. 2, a schematic view of one embodiment of an electrical (power) and control system 200 that may be used with the wind turbine 100 is illustrated. During operation, wind impacts the blades 108 and the blades 108 transform wind energy into a mechanical rotational torque that rotatably drives a low-speed shaft 112 via the hub 110.

In the exemplary embodiment, the low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Alternatively, system 200 is configured as a full power conversion system (not shown) known in the art, wherein a full power conversion assembly (not shown) that is similar in design and operation to assembly 210 is electrically coupled to stator 120 and such full power conversion assembly facilitates channeling electrical power between stator 120 and an electric power transmission and distribution grid (not shown). Stator bus 208 transmits three-phase power from stator 120 and rotor bus 212 transmits three-phase power from rotor 122 to assembly 210. Stator synchronizing switch 206 is electrically coupled to a main transformer circuit breaker 214 via a system bus 216.

Due to the high possible power rating at given size/costs, wind turbines with full power conversion assembly are widely used in offshore wind farms.

In addition, the electrical power and control system 200 may include a wind turbine controller 202 configured to control any of the components of the wind turbine 100 and/or implement any of the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module to facilitate communications between the controller 202 and the various components of the wind turbine 100, e.g. any of the components of FIG. 2.

Figure 3:
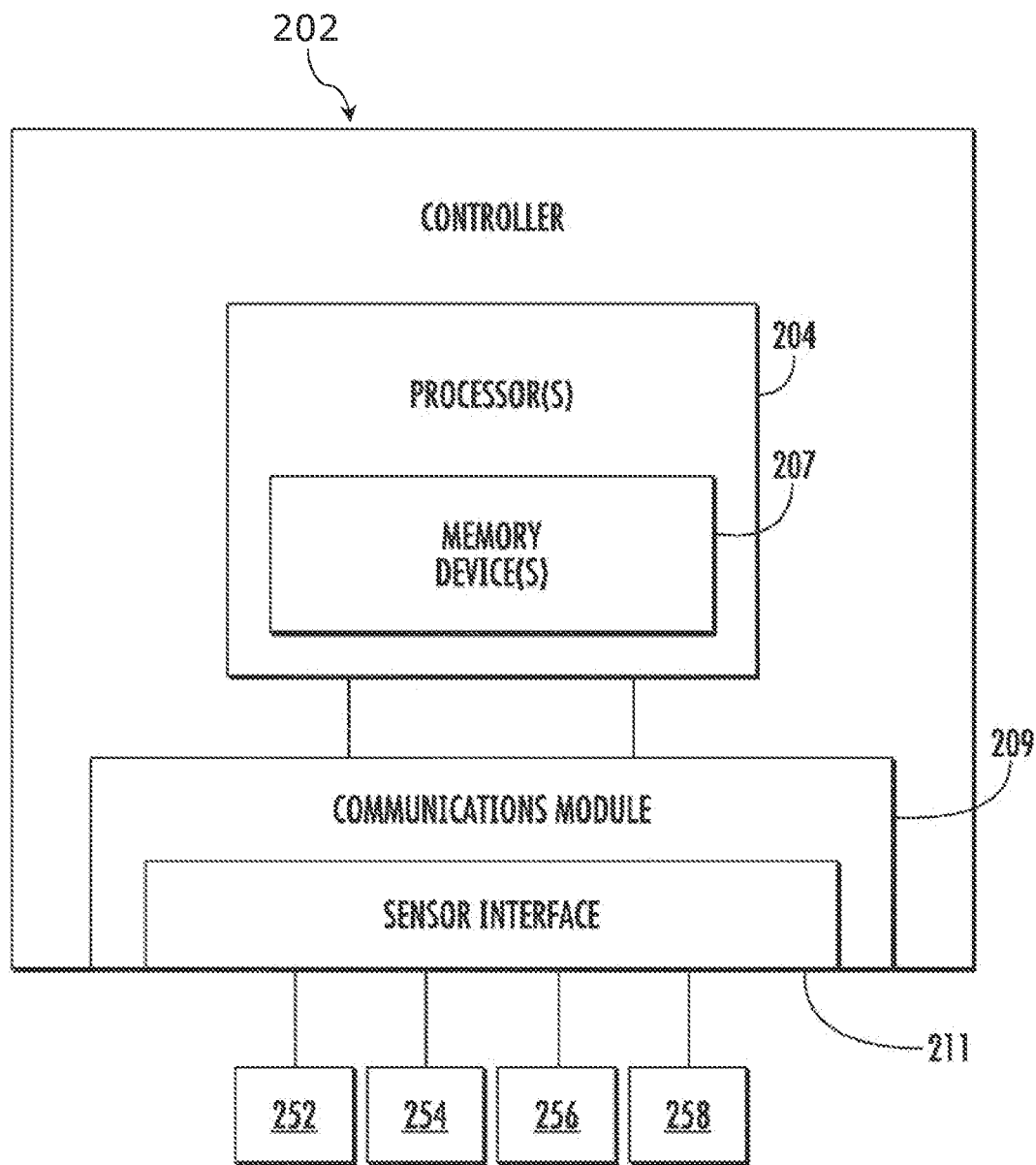
FIG. 3 illustrates a block diagram of one embodiment of a controller suitable for use with the wind turbine shown in FIG. 1.

Further, as shown in FIG. 3, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

The sensors 252, 254, 256 may be sensor for currents and/or voltages desired for controlling the power conversion of wind turbine 100. This is explained in more detail below.

Further, at least one additional sensor (not shown) may be provided for sensor data referring to meteorological data, e.g. sensor(s) provided by the meteorological mast 107 shown in FIG. 1. The at least one additional sensor 258 may in particular include a sensor for determining a wind speed at or in front of rotor 106 of wind turbine 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Accordingly, a current frequency of the grid may be determined by controller 202. Alternatively or in addition, turbine controller 202 may be functionally coupled with a frequency sensor connectable with the grid. Further, it is possible that controller 202 receives the current frequency of the grid or at least a signal representative for the current frequency of the grid via primary plant controller such as a wind farm controller functionally coupled with a respective sensor.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. In the exemplary embodiment, the associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, generator 118, power conversion assembly 210 electrically coupled to generator 118 and step-up transformer 234 form the power conversion system of wind turbine 100.

Typically, the power conversion system at least includes a generator and a power conversion assembly including a power converter, in particular an indirect AC-to-AC power converter (AC/DC-AC converter) or a matrix converter, for example a respective full converter or DFIG converter depending on the generator.

Figure 4:
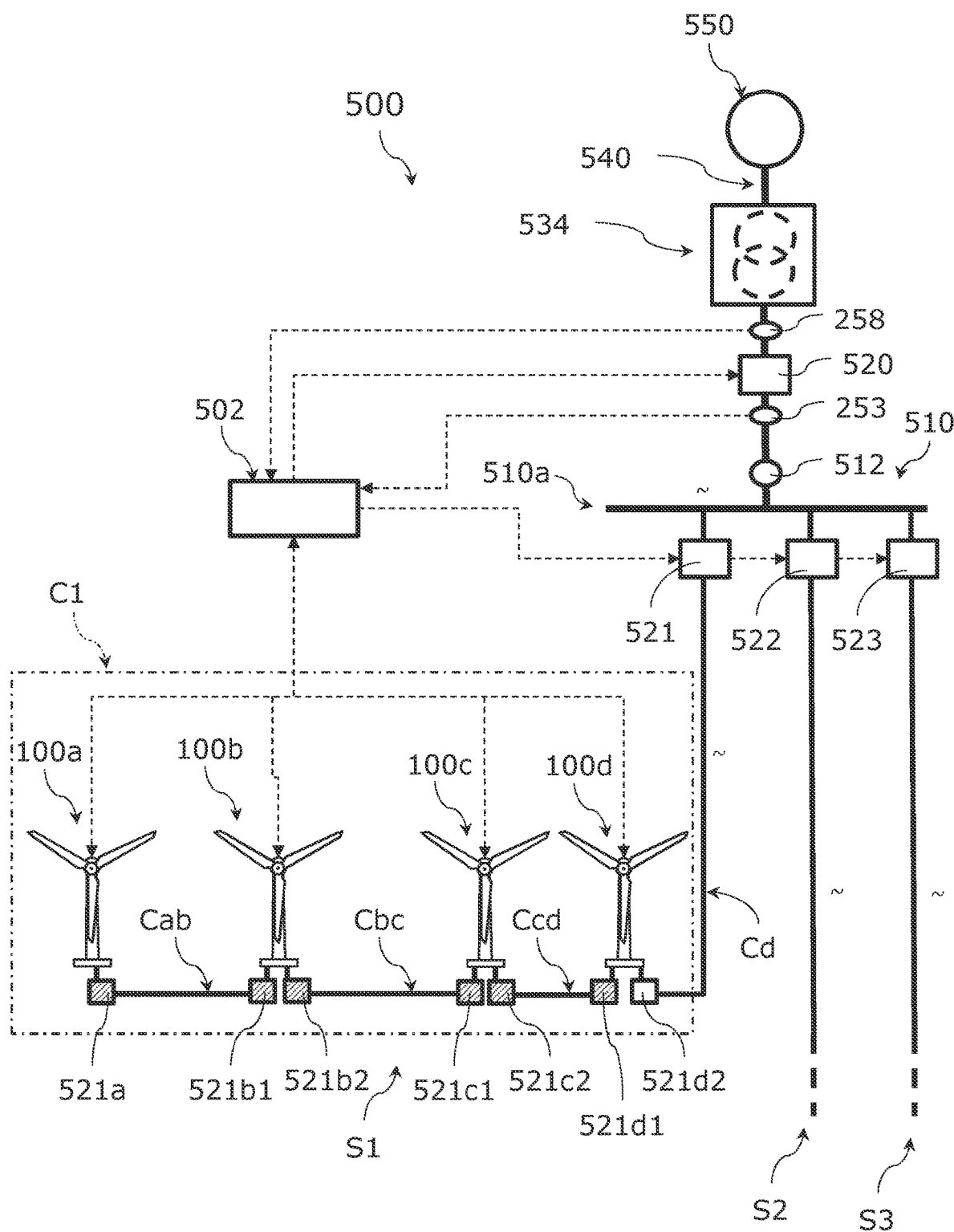
FIG. 4 illustrates a block diagram of one embodiment of a wind farm according to the present disclosure.

FIG. 4 illustrates a block diagram of a wind farm 500. In the exemplary embodiment, wind farm 500 is an offshore wind farm.

Wind farm 500 has several strings S1-S3 of wind turbines. For sake of clarity, only string S1 is shown in more detail in FIG. 4. Each of the other strings S2, S3 may be similar or even equal to string S1 (at least prior to clustering). However, at least the number of wind turbines and/or the length (of the power connections) may vary between the strings S1-S3.

For sake of clarity, strings S1 includes four exemplary wind turbines 100a, 100b, 100c, 100d, for example four wind turbines as explained above with regard to FIG. 1 to FIG. 3. However, string S1 may also have at least five or at least ten wind turbines.

The wind turbines 100a, 100b, 100c, 100d are electrically connected with each other via power cables Cab, Cbc, Ccd and closed power switches 521a, 521b1, 521b2, 521c1, 521c2, 521d1.

Further, the wind turbines 100a-100d are electrically connectable with a power grid bus 510a of a local wind farm grid 510 via a feeder (power cable) Cd connected with a power switch 521d2 and a circuit breaker 521. Respective circuit breakers 522, 523 are also provided for wind turbine strings S2, S3.

The power cables Cab, Cbc, Ccc and the feeder Cd may be implemented as respective undersea cables.

FIG. 4 illustrates a state of wind farm 500 in which the circuit breakers 521-523 are open and, thus, the strings S1-S3 disconnected from power grid bus 510a and the (onshore) utility grid 550, for example in response to a failure or absence of utility grid 550 or in the electrical connection between local wind farm grid 510 and utility grid 550.

In the exemplary embodiment, a point of common coupling (PCC) of local grid 510 is connectable with utility grid 550 via a main circuit breaker 520 (illustrated in open state), a grid substation 534 and a power link 540 which is typically implemented as an undersea cable.

In the exemplary embodiment, wind farm 500 is an offshore wind farm. However, the embodiments explained below can also be applied to onshore wind farms using a power link 540 to transmit power to a distant (utility) grid.

Power link 540 may either be a DC-link, in particular a high voltage DC-link (HVDC-link) or an AC-link, in particular a high voltage AC-link (HVAC-link).

In embodiments in which the wind farm 500 is electrically connectable to grid 550 using an AC link 540, (offshore) wind farm grid substation 534 connectable between local AC-grid and power link 540 typically includes a grid transformer as indicated by the dashed electric symbol in box 534.

In embodiments in which the wind farm 500 is electrically connectable to grid 550 using a DC link 540, wind farm grid substation 534 includes an AC-DC power converter (power inverter).

Note that the main circuit breaker 520 and/or one or more sensors 258 for measuring currents and/or voltages at the lower voltage side and/or the high voltage side (not shown in FIG. 4) of grid substation 534 may also be provided by the substation 534.

As indicated by the dashed arrows in FIG. 4, a wind farm controller 502 is communicatively coupled with the wind turbines 100*a*-100*d*, more particular its turbine controllers (not shown in FIG. 4), the circuit breaker 520-523, the sensors 253, 258 and the optional substation 534.

In this embodiment, wind farm controller 502 and wind turbine controllers together form a control system which is communicatively coupled with the power conversion systems and the auxiliary subsystems of the wind turbines 100*a*-100*d*.

Wind farm controller 502 is typically directly communicatively coupled with the turbine controllers, the substation 534 and the main circuit breaker 520. Further, wind farm controller 502 may be directly or via the turbine controllers communicatively coupled with circuit breakers 521-523, the current sensors 253, 258, and optionally with meteorological data sensors provided by the wind turbines 100*a*-100*d*.

The general design of the wind farm controller 502 may at least substantially corresponds to the design of the wind turbine controller as explained above with regard to FIG. 3. However, wind farm controller 502 may be more complex and/or more powerful. Further, wind farm controller 502 typically operates as a primary controller supervising the wind turbine controllers during controlling the wind turbines in normal operating mode, idling operating mode, grid forming mode and stand still operating mode. For example, wind farm controller 502 may provide SCADA (Supervisory Control And Data Acquisition) functionality for wind farm 500.

In the illustrated state of wind farm 500, circuit breakers 520-523 are open. Accordingly, strings S1-S3 of wind farm 500 are electrically disconnected from each other and utility grid 550. This may be due to an outage or another failure of utility grid 550 that may e.g. be detected using data provided by sensor 258.

In this state and after disconnecting wind farm 500 from utility grid 550, respectively, wind farm controller 502 may search for a primary wind turbine of the wind turbine in string S1 that has a reactive power capability which is sufficient to match the reactive power of string S1, i.e. the reactive power of the other wind turbines when operated in idling operating mode or stand still mode, and of the power connections (power cables Cab, Cbc, Ccc and the feeder Cd).

In the illustrated embodiment, no such wind turbine was found. However, wind farm controller 502 has determined that the reactive power could be balanced by one of the wind turbines, for example wind turbine 100*a* if the feeder Cd is electrically isolated from the wind turbines 100*a*-100*d*, for example because the length of feeder Cd is too large resulting in an inductance or capacitance that would absorb or produce reactive power that together with the produced reactive power of other components, in particular the power cables Cab, Cbc, Ccc cannot be compensated by the power conversion system of one of the wind turbines (under the current conditions).

Accordingly, wind farm controller 502 decides that a cluster C1 is to be formed which is electrically isolated from feeder Cd.

Forming of cluster C1 may be achieved by controlling the circuit breakers 521*a*-521*d*2 so that the circuit breakers 521*a*-521*d*1 between the power cables Cab-Ccd are closed (as illustrated by the hatched respective rectangles in FIG. 4) and the circuit breaker 521*d*2 between wind turbine 100*d* and feeder Cd is open (as illustrated by the unfilled rectangle 521*d*2 in FIG. 4), for example by sending respective commands to the circuit breakers 521*a*-521*d*2.

Alternatively, if a wind turbine is found which has a power conversion system with large enough reactive power capability to also compensate the produced reactive power of feeder Cd when connected, wind farm controller 502 may decide that a cluster including feeder Cd is to be formed and is formed, respectively. In this embodiment, controller 502 may also control the circuit breaker 521*d*2 to be closed.

Alternatively, if isolating feeder Cd is found not to be sufficient for reactive power balancing of string S1, wind farm controller 502 may try to cluster string S1 in several clusters C11, C12.

Figure 5:
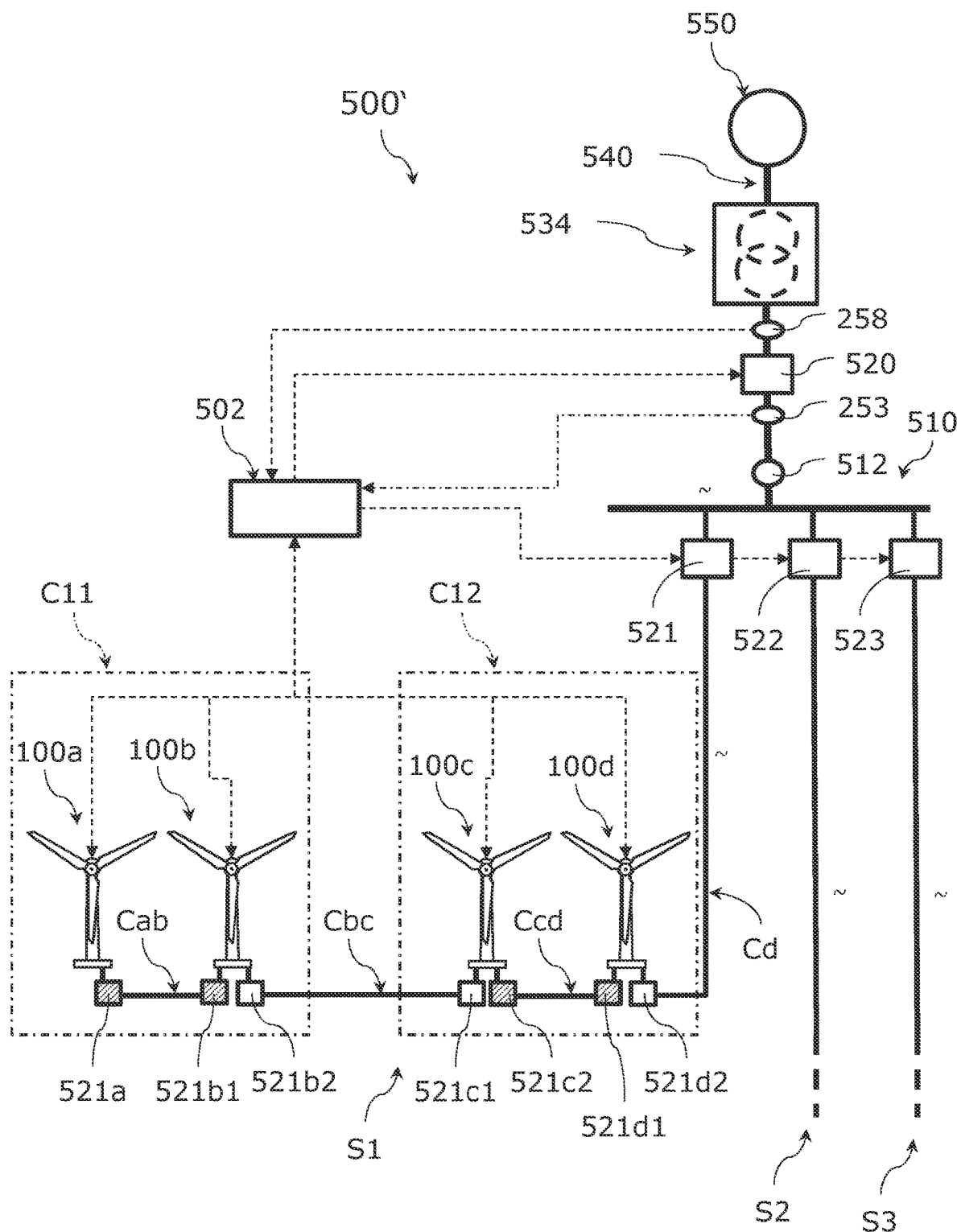
FIG. 5 illustrates a block diagram of one embodiment of a wind farm according to the present disclosure.

This is illustrated in FIG. 5 showing a similar wind farm 500' which may even correspond to wind farm 500.

In the illustrated embodiment, wind farm controller 502 has determined that power cable Cbc between wind turbine 100*b*, 100*c* is also to be electrically isolated for reactive power balancing in two clusters C11, C12 to be formed by appropriately controlling the states of circuit breakers 521*a*-521*d*2 (open state and closed state corresponds to unfilled and filled rectangles/squares, respectively).

Alternatively and similar as explained above with regard to FIG. 4, wind farm controller 502 may decide that cluster C12 including feeder Cd may be formed if the reactive power capability of at least one of the wind turbines 100*c*, 100*d* is large enough.

After forming the clusters C1, C11, C12 as shown in FIGS. 4, 5, the wind turbine with largest reactive power capability, for example turbine 100*a* of cluster C1, turbine 100*a* of cluster C11, and turbine 100*c* of cluster C12 may be selected by wind farm controller 502 as respective primary wind turbine, and the other wind turbines may be selected by wind farm controller 502 as respective secondary wind turbines.

Subsequently, wind farm controller 502 may instruct and/or supervise the turbine controllers to operate the primary and secondary wind turbines of string S1 in the respective modes.

In particular, the (selected or identified) primary wind turbines may be operated in an island operating mode, in particular in a grid forming mode, so that the reactive power of the respective cluster C1, C11, C12 of wind turbines is met by the power conversion system of the primary wind turbines while the (selected or identified) secondary wind turbines are operated in idling mode.

This control scheme may independently be used for any of the strings S1-S3.

In the following methods are explained that may be performed by wind farm 500 and/or controlled by the control system of wind farm 500.

Figure 6B:
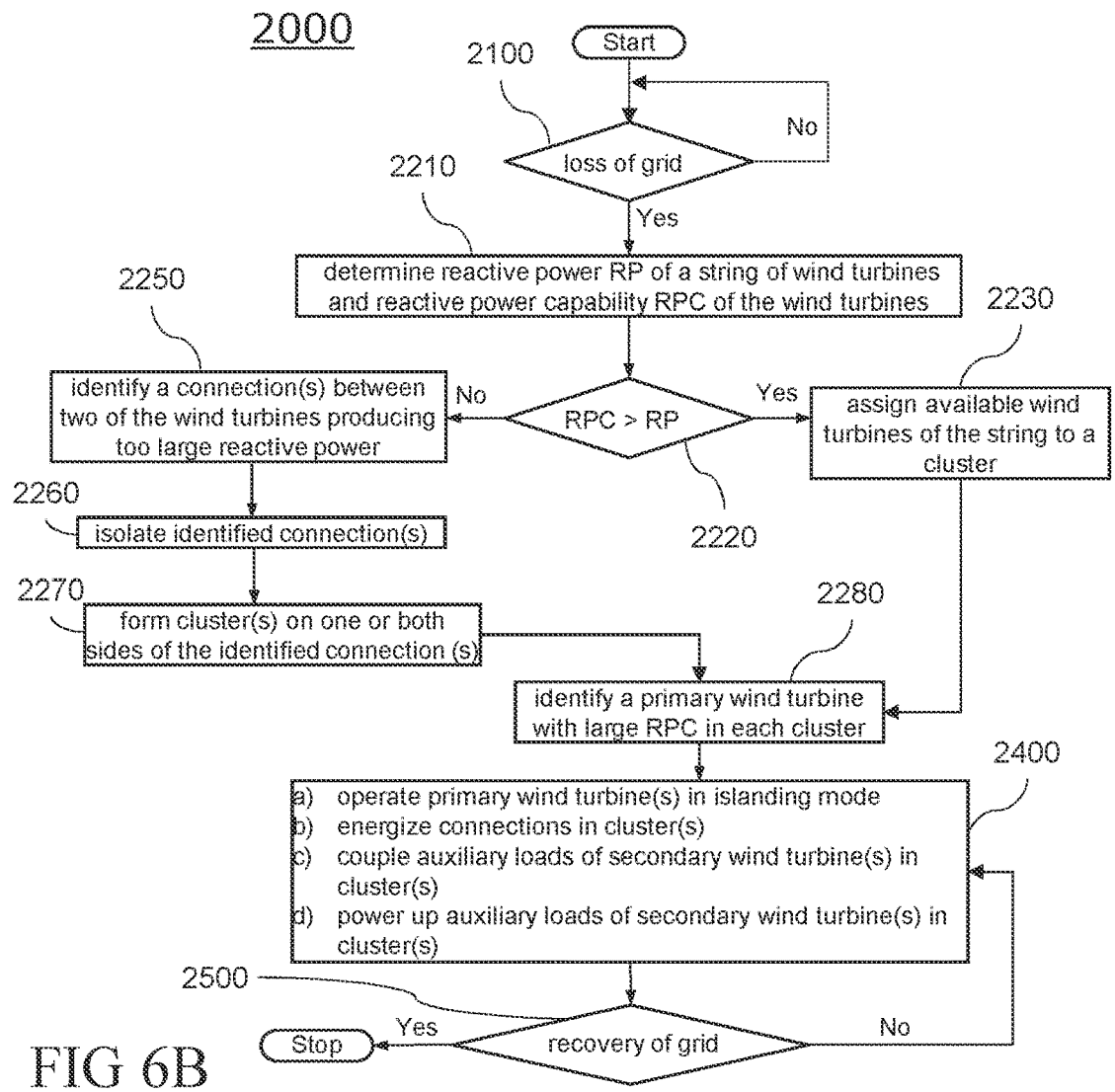
FIG. 6B illustrates a flow chart of a method according to an embodiment of the present disclosure.
Figure 6A:
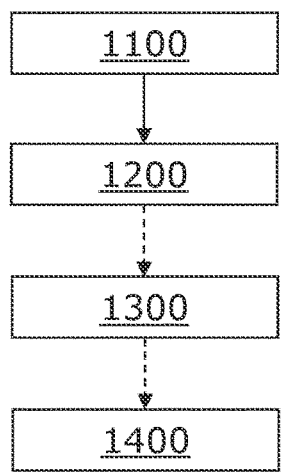
FIG. 6A illustrates a flow chart of a method according to an embodiment of the present disclosure.

FIG. 6A illustrates a flow chart of a method 1000 for operating a wind farm, in particular a wind farm as explained above with regard to FIGS. 4, 5.

In a first block 1100, one or more strings of wind turbines are disconnected from a utility grid (and each other).

Thereafter, in a block 1200, a respective primary wind turbine is identified for each of the one or more disconnected strings. The primary wind turbine is electrically connectable with one or more secondary wind turbine of the respective disconnected string, and its power conversion system can provide a reactive power capability that at least matches a reactive power of a cluster which can be formed by electrically connecting the primary wind turbine with the one or more secondary wind turbines of the respective disconnected string (including the power connection(s)).

Thereafter, in a block 1300, cluster(s) of wind turbines may be formed for the one or more disconnected strings. This may be achieved by electrically connecting the identified primary wind turbine(s) with the corresponding secondary wind turbine(s) via respective power connections.

Thereafter, in a block 1400, the power conversion system of the respective primary wind turbine is operated in an island operating mode (in particular a grid forming mode) so that the active and reactive power of the formed cluster of wind turbines is met by the power conversion system.

FIG. 6B illustrates a flow chart of a method 2000 for operating a wind farm, in particular a wind farm as explained above with regard to FIGS. 4, 5. Method 2000 may be similar to method 1000 but is more specific.

In a first block 2100, it is checked if a loss or failure of a utility grid the wind farm is/has been feeding output power to is detected.

If so, at least the strings of wind turbines of the wind farm are disconnected from the utility grid (and each other).

Thereafter, the respective reactive power RP of the string(s) and the (current) reactive power capabilities RPC of the wind turbines of the string(s) may be determined mode in a block 2210.

In a subsequent block 2220, it is checked for each of the string(s) if the reactive power capabilities RPC (of at least one wind turbine) is larger than the respective reactive power RP.

If so, the (available) wind turbines of the string(s) are assigned to one respective cluster in a block 2230.

Otherwise, it is searched for a power connection(s) in the respective string, in particular a power connection between two wind turbines which is expected to produce a too large reactive power when connected (e.g. has a too large inductance or capacitance) in a block 2250.

If so, it is decided that the respective power connection(s) in the string is to be isolated (excluded from the clusters to be formed) in a block 2260.

Thereafter, clusters may be formed without the than isolated power connection(s) in a block 2270.

Typically, the wind turbine with the largest reactive power capability RPC is identified as the respective primary wind turbine for the cluster(s) in a block 2280.

Thereafter, in a block 2400, the identified primary wind turbine(s) are operated in an island operating mode so that the reactive power RP of the respective cluster is met by the power conversion system of the primary wind turbine.

Typically block 2400 includes the sub blocks of issuing the primary wind turbine(s) to operate in the islanding mode and operating the primary wind turbines in the islanding operating mode, respectively (sub block a)), energizing the power connections of the cluster(s) (sub block b)), coupling the auxiliary subsystems of the secondary wind turbine(s) in the cluster(s) with the power connections and the power conversion system of the primary wind turbine, respectively, in a sub block c), and powering up the auxiliary subsystems of the secondary wind turbine(s) in the cluster(s), in a sub block d).

Thereafter, in a block 2500, it is checked if the utility grid is/has recovered.

If so, method 2000 may be stopped. Thereafter, processes of reconnecting the string(s) (to be formed from cluster(s) and any isolated power connections) to the utility grid may be initiated.

Otherwise, method 2000 may return to block 2400.

Figure 6C:
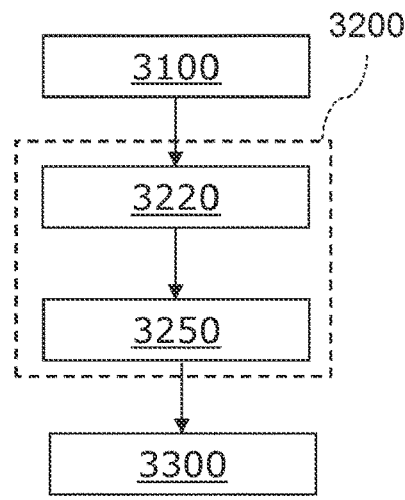
FIG. 6C illustrates a flow chart of a method according to an embodiment of the present disclosure.

FIG. 6C illustrates a flow chart of a method 3000 for operating a wind farm, in particular a wind farm as explained above with regard to FIGS. 4, 5.

Similar as explained above for method 1000, 2000, the string(s) of wind turbines of a wind farm are disconnected from a utility grid (and each other) in a first block 3100.

Thereafter, an actual reactive power capability of the power conversion systems may be determined in a block 3220.

Thereafter, one or more power connections may be identified which are, when connected with the power conversion system having a largest (expected) current (actual) reactive power capability, expected to produce a reactive power which is too large to be (also) met by the respective power conversion system, in a block 3250.

Thereafter, the wind turbines of the string are clustered into one or more clusters so that the identified power connections are (electrically) isolated from cluster(s). Each cluster typically includes the wind turbine with largest current reactive power capability as primary wind turbine and one or more secondary wind turbines.

Thereafter, the primary and secondary wind turbines may be operated as explained above with respect to blocks 1400, 2400.

Note that blocks 3220 and 3250 of method 3000 may also be considered as (respective sub processes of) a block 3200 of identifying primary and secondary wind turbines of clusters of the respective disconnected string.

Note further that method 3000 (as well as method 1000) may also be performed until grid recovery is detected.

Thereafter, the wind farm may be reconnected to the utility grid.

Exemplary embodiments of wind farms and methods for operating wind farms are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 204 discussed above with reference to FIG. 3, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 204 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. For example, the control system of the wind farm may be provided by one centralized controller or a plurality of interconnected controllers. Such other examples are intended to be within the scope of the claims if they have structural elements that do not differ from the literal language of the claims, or if they include equivalent structural elements with insubstantial differences from the literal language of the claims.

REFERENCE NUMBERS wind turbine 100-100d
nacelle 102
tower 104
yaw system 105
rotor 106
meteorological mast 107
blades 108
pitch system 109
hub 110
low speed shaft 112
gearbox 114
high speed shaft 116
generator 118
generator stator 120
generator rotor 122
control system 200
turbine controller 202
processor 204
synchronizing switch 206
memory 207
stator bus 208
communications module 209
power conversion assembly 210
sensor interface 211
rotor bus 212
transformer circuit breaker 214
system bus 216
rotor filter 218
filter bus 219
rotor-side power converter 220
line side power converter 222
line side power converter bus 223
line filter 224
line bus 225
line contactor 226
conversion circuit breaker 228
conversion circuit breaker bus 230
connection bus 232
electric power main transformer 234
generator-side bus 236
grid circuit breaker 238, 538
breaker-side bus 240
distribution grid via a grid bus 242, 524
DC link 244
positive rail 246
negative rail 248
capacitor 250
electric current sensors 252
electric current sensors 253
electric current sensors 254
electric current sensors 256
meteorological data sensors 258
converter controller 262
electric current sensors 264
(offshore) wind farm 500, 500'
local (AC) grid 510
power grid bus 510a
PCC 512
circuit breaker 520-523
(offshore) grid substation 534
(HVDC-) link to utility grid 540
(onshore) utility grid 550

Wind turbine cluster C1-C12
Cable connection/feeder Cab-Cd
Strings of wind turbines S1, S2, S3
method, method steps 1000-3300

The invention claimed is:

1. A method for operating a wind farm that includes a string of wind turbines electrically connectable with each other and connectable with a grid via power connections, each of the wind turbines having a rotor with rotor blades, and a power conversion system mechanically connected with the rotor, the method comprising:
   disconnecting the string from the grid; and
   identifying at least two primary wind turbines of the disconnected string for separate respective clusters, each of the at least two primary wind turbines electrically connectable with at least one respective secondary wind turbine of the disconnected string;
   wherein the power conversion system of each of the at least two primary wind turbines has a reactive power capability (RPC) that at least matches a reactive power (RP) of the respective cluster that is formed by electrically connecting each of the at least two primary wind turbines with the at least one respective secondary wind turbine in the respective cluster of the disconnected string, wherein the formed clusters are disconnected from each other, and wherein the at least two primary wind turbines are operated in an island operating mode so that the reactive power (RP) of the respective cluster is met by the power conversion system of the respective primary wind turbine.

2. The method of claim 1, further comprising:
   searching for the at least two primary wind turbines and a power connection between the at least two primary wind turbines and the at least one respective secondary wind turbine;
   assigning the at least two primary wind turbines and as many as possible of the remaining wind turbines of the disconnected string as additional respective secondary wind turbines to the cluster so that the reactive power capability (RPC) of each of the identified at least two primary wind turbines at least matches the reactive power (RP) of the additional respective secondary wind turbines and the respective power connections between the wind turbines of the cluster;
   electrically connecting the identified at least two primary wind turbines with the at least one respective secondary wind turbine of the disconnected string via the respective power connections to form the cluster of the disconnected string; and
   operating the identified at least two primary wind turbines in the island operating mode so that the reactive power (RP) of the cluster of wind turbines is met by the power conversion system of the identified at least two primary wind turbines.

3. The method of claim 1, wherein the wind turbine in the disconnected string with the largest reactive power capability (RPC) is identified as one or the at least two primary wind turbines for the cluster.

4. The method of claim 1, wherein at least one of the at least two primary wind turbines is operated in a grid forming operating mode to establish a stable local grid within the cluster of the wind turbines.

5. The method of claim 1, wherein the at least one respective secondary wind turbine is, after forming the cluster, operated in an idling operating mode or a stand still operating mode.

6. The method of claim 1, wherein the string is disconnected from the grid after detecting a loss of the grid.

7. The method of claim 6, after further detecting a recovery of the grid, further comprising connecting the string with the grid.

8. The method of claim 1, wherein the wind farm includes a plurality of the strings of wind turbines, each of the strings separately connectable with a point of common coupling of the wind farm to the grid, and wherein the method is performed independently for each of the strings of wind turbines.

9. A wind farm, comprising:
   a string of wind turbines that are electrically connectable with each other and a grid, each of the wind turbines comprising a rotor with rotor blades, and a power conversion system mechanically connected with the rotor;
   a control system communicatively coupled with the power conversion system of each of the wind turbines, the control system configured to perform the following;
      disconnecting the string from the grid; and
      identify at least two primary wind turbines of the disconnected string for separate respective clusters, each of the at least two primary wind turbines electrically connectable with at least one respective secondary wind turbine of the disconnected string;
      wherein the power conversion system of each of the at least two primary wind turbines has a reactive power capability (RPC) that at least matches a reactive power (RP) of the respective cluster that is formed by electrically connecting each of the at least two primary wind turbines with at least one respective secondary wind turbine in the respective cluster of the disconnected string, wherein the formed clusters are disconnected from each other, and wherein the at least two primary wind turbines are operated in an island operating mode so that the reactive power (RP) of the respective cluster is met by the power conversion system of the respective primary wind turbine.

10. The wind farm of claim 9, wherein the control system is further configured to perform the following:
    search for the at least two primary wind turbines and a power connection between the at least two primary wind turbines and the at least one respective secondary wind turbine;
    assign the at least two primary wind turbines and as many as possible of the remaining wind turbines of the disconnected string as additional respective secondary wind turbines to the cluster so that the reactive power capability (RPC) of each of the identified at least two primary wind turbines at least matches the reactive power (RP) of the additional respective secondary wind turbines and the respective power connections between the wind turbines of the cluster;
    electrically connect the identified at least two primary wind turbines with the at least one respective secondary wind turbine of the disconnected string via the respective power connections to form the cluster of the disconnected string; and
    operate the identified at least two primary wind turbines in the island operating mode so that the reactive power (RP) of the cluster of wind turbines is met by the power conversion system of the at least two primary wind turbines.

11. The wind farm of claim 9, comprising a plurality of the strings of wind turbines, wherein the control system is configured to control each of the strings independently of each other.

12. The wind farm of claim 9, wherein the control system comprises a wind farm controller communicatively coupled to a wind turbine controller for each power conversion system, the wind farm controller operable as a primary controller configured to disconnect the string from the grid and identify the at least two primary wind turbines, wherein the wind turbine controllers are operable as a secondary controllers configured to control the at least two primary wind turbines in the island operating mode.

* * * * *